United States Patent [11] 3,598,107

| [72] | Inventors | Satoshi Ishikawa<br>Tokyo;<br>Masao Okabe, Hamamatsu; Yuji<br>Hakamata, Hamamatsu, all of, Japan |
|---|---|---|
| [21] | Appl. No. | 747,543 |
| [22] | Filed | July 25, 1968 |
| [45] | Patented | Aug. 10, 1971 |
| [73] | Assignee | Hamamatsu T.V. Company, Limited<br>Hamamatsu, Shizuoka, Japan |

[54] PUPILLARY MOTION OBSERVING APPARATUS
1 Claim, 6 Drawing Figs.

[52] U.S. Cl. ................................................ 128/2,
351/6, 351/7
[51] Int. Cl. ........................................... A61b 3/10
[50] Field of Search .......................................... 128/2;
351/7, 6, 23, 39; 250/206, 221, 220

[56] References Cited
UNITED STATES PATENTS

| 3,525,565 | 8/1970 | O'Neill et al. | 351/6 |
| 2,445,787 | 7/1948 | Lilienfeld | 351/7 |
| 2,573,464 | 10/1951 | Lowenstein et al. | 351/7 |
| 3,036,568 | 5/1962 | Stark | 128/2 |
| 3,433,935 | 3/1969 | Sherman | 128/2 X |
| 3,473,868 | 10/1969 | Young et al. | 351/6 |

OTHER REFERENCES

Feinberg, R., Transactions Of The International Opthalmic Optics Congress, 1961, publ. in London, 1962, British Optical Assoc., pp. 268— 273, RE951 155, Lib. of Cong. (copy in GR. 250, 351/6)

Roth; N., The Review Of Scientific Instruments, Vol. 36, No. 11, Nov. 1965, pp. 1636— 1639, (copy in GR. 250, 351/6)

*Primary Examiner*—Richard A. Gaudet
*Assistant Examiner*—Kyle L. Howell
*Attorney*—Laurence R. Brown

ABSTRACT: A television system using an infrared vidicon is used for displaying the pupil of a human eye to provide a measure of pupil size. Line scanning video signals scanned across the pupil may be monitored and clipped at a predetermined threshold level to determine the width of the pupil and therefore the area of the pupil.

Line scans across the pupil are detected by an electronic system to provide an indication of pupil size.

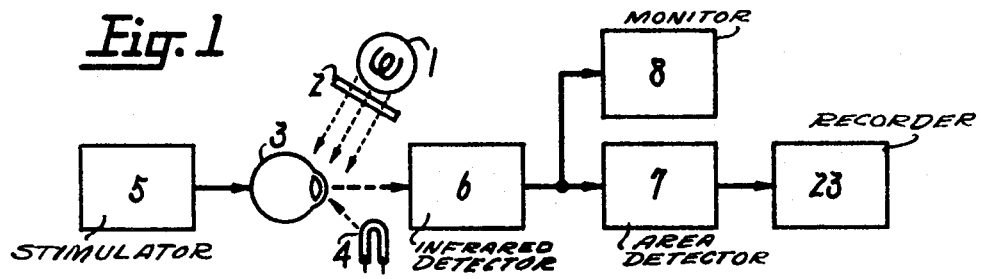
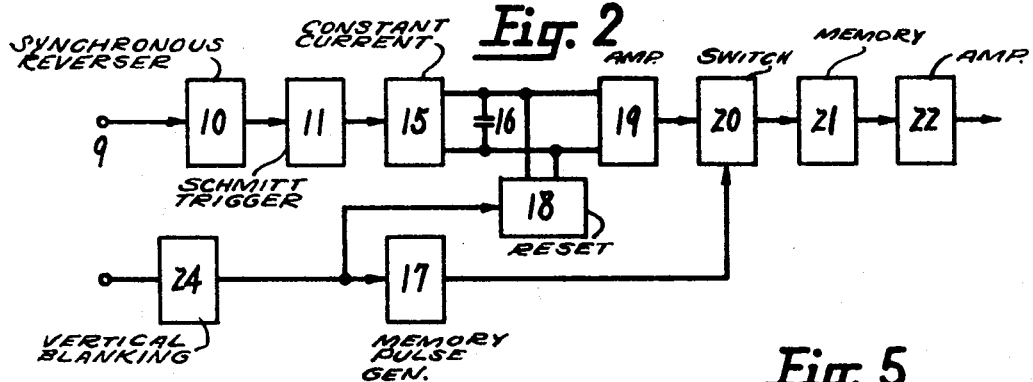
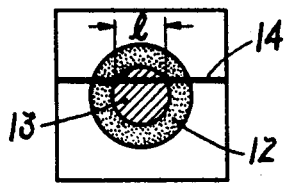
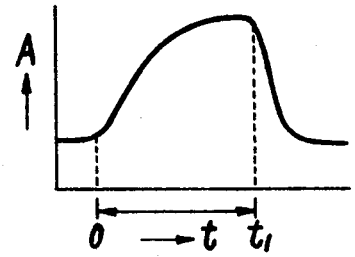
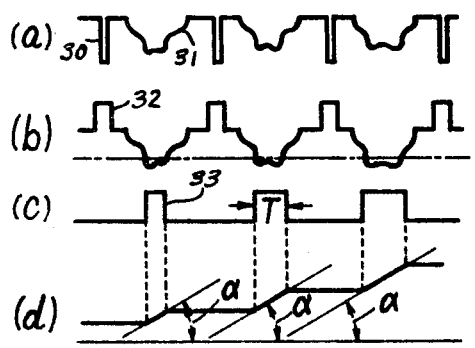
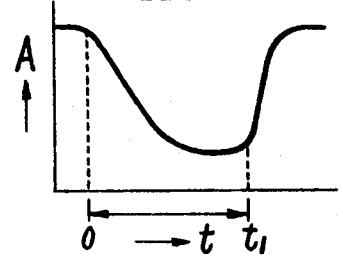
INVENTORS
Satoshi ISHIKAWA,
Masao OKABE, and
Yuji HAKAMATA
BY Laurence R. Brown
ATTORNEY

PUPILLARY MOTION OBSERVING APPARATUS

This invention relates to a pupillary motion observing apparatus.

The observation of the motion of a pupil is very important particularly to the diagnosis of diseases in both ophthalmology and neurology fields. The overall observation of the pupil is generally inaccurate. In some countries or particularly in America, there is a method of continuously photographing it with an infrared film or observing it by using a noctovision. But there are shortcomings that no direct quantitative measurement value can be obtained without an enormous cost.

Therefore, an object of the present invention is to provide an apparatus whereby the motion of a pupil can be recorded quantitatively without any time delay.

Another object of the present invention is to provide a tiny inexpensive apparatus whereby accurate medical examinations and diagnoses can be made quickly without requiring any skill.

A further object of the present invention is to provide an apparatus whereby it is not necessary to apply any mydriatic to eyes and therefore no pain will be felt by the patient.

In the accompanying drawings:

FIG. 1 is a block diagram of an embodiment of the present invention;

FIG. 2 is a more detailed block diagram of an area detecting means of the apparatus in FIG. 1;

FIG. 3 is a view showing an optical image projected on a image pickup means by means of the apparatus in FIG. 1;

FIG. 4 shown wave form diagrams for explaining the operation of the apparatus in FIG. 1;

FIGS. 5 and 6 show examples of recorded curves observed with apparatus of FIG. 1.

FIG. 1 shows an embodiment of the present invention.

The eyeball 3 of a patient is illuminated in a dark room with a known infrared irradiating means such as an infrared filter 2 on a 1. A Xenon flash 4 or 5 in a basic experiment are employed for the stimulus to the pupil. Further, if a proper stimulation is given to the eye so that the pupil has contracted in a bright room, the pupil will gradually dilate to open in a dark room. The infrared image of pupil motion is displayed on the photosensitive surface of an infrared image pickup means 6. Since an infrared filter is provided in front of the image pickup means 6, irrespective of the visible rays of the xenon lamp 4 for dilating or contracting the pupil by irradiation to the eye, an image of a fixed brightness will be projected on the image pickup means 6 which senses only the rays of the infrared irradiating means. Therefore, the image pickup means 6 will stably view the dilating or contracting motion of the pupil and will send out its video signal with vertical and horizontal synchronous signals superposed on it. As those signals are fed into an area detecting means 7 and a monitoring device 8, the motion of the pupil can be observed with the monitoring device 8. In the area detecting means 7, as shown in FIG. 2, the video signal applied from a terminal 9 will control a Schmitt trigger circuit 11 through a synchronous signal polarity reverser 10. That is to say, if an image of an eyeball as shown in FIG. 3 is projected on the photosensitive surface of the photosensitive surface of the image pickup means 6, the iris part 12 and pupil 13 will be low in brightness. Therefore, if it is scanned with any scanning line 14, there will be obtained a video signal of a substantially inverted convex form as shown in FIG. 4 (a). Since the iris and pupil are circular, when the scanning line moves down, the time width of the above mentioned video signal in the scanning line will gradually increase to reach the maximum value and will again gradually decrease. Further, between the respective unit video signals, a horizontal synchronous signal of the inverse polarity to these signals will be inserted as shown in FIG. 4 (b) and, at the same time, though not illustrated, whenever the scanning of one frame is completed, a vertical synchronous signal will be inserted. The form of these synchronous signals is the same as in general industrial television apparatus.

In the synchronous signal polarity reverser 10, positive polarity pulses 32 synchronized with the synchronous signal 30 and having a large amplitude somewhat wider than that of said signal will be superposed as shown in FIG. 4(a) and (b). Therefore, if the trigger level is adjusted to be in the projecting part of the video signal, that is, in between the parts 31 corresponding to the pupil 13, the Schmitt trigger circuit 11 will send out square waves 33 as shown in FIG. 4 (c). The time width T of this unit square wave is proportional to the time during which one scanning line, for example, a scanning line 14 scans the pupil 13 and therefore to the distance $l$. Further, when a constant current circuit 15 is controlled with such square wave signal as in FIG. 4 (c), whenever each unit square wave is applied, a constant current $i$ will be able to be sent out of said circuit. As a condenser 16 is charged with said current $l$, the terminal voltage of this condenser will increase with a fixed angle $\alpha$ of inclination for each square wave in FIG. 4 (c) as in FIG. 4 (d). Whenever the image pickup means 6 completes the scanning of one frame, the condenser 16 will discharge the stored charge by reset circuit 18. Therefore, the voltage of the condenser 16 will be zero in the initial period of scanning one frame but will rise by the voltage proportional to the distance $l$ as the horizontal scanning line gradually lowers from the upper end of the photosensitive surface to cross the image 13 of the pupil and will reach the maximum value when the scanning line has reached the lower end to complete the scanning of one frame. This value is evidently proportional to the area of the image 13 of the pupil. This voltage is amplified with a high input impedance amplifier 19 and is applied to a memory circuit 21 through a switch circuit 20. The memory pulses generated from the memory pulse generating circuit 17 are applied to the switch circuit 20 so that the switch circuit may be in a conducting state for a short time and transfers the voltage of the condenser to the memory circuit 21 just before the reset is applied.

Further, the operation of the memory and the reset is practiced within the period of the vertical blanking pulse from generator 24. Whenever the scanning of one frame ends, the memory circuit 21 will memorize a voltage proportional to the area of the pupil and will hold the memorized value during the next period of one frame.

Since the output of this memory circuit 21 is amplified with as high input impedance amplifier 22 and is applied to a recording system 23 as shown in FIG. 1, the dilation and contraction of the pupil will be recorded by a commercial recorder. For the recording, an analog automatic balance recorder may be used. Further, when the output is applied to a numerical value recording means through a proper analog to digital converter, it will be possible to type and record the area of the pupil at intervals of a fixed time.

FIG. 5 shows a curve of the relation between the time $t$ and pupil area A in the case that the pupil was gradually dilated by giving a longer stimulus to the eyeball in which the pupil was contracted from a time 0 to $t_1$ as recorded with an automatic balance recorder in such apparatus as is described above. FIG. 6 shows an example of the same curve in the case that the pupil was contracted by giving an irradiation to the eyeball in which the pupil was dilated from a time 0 to $t_1$. Therefore, for example, if a standard curve in each symptom is recorded in advance and an observed curve is compared with it, an accurate diagnosis will be made easily without any skill.

As has been explained in the above with reference to the described embodiment of the present invention, such difficulty as causing pain to the patient when using conventional diagnosing methods can be eliminated and, at the same time, an accurate observation of the pupil motion can be made independent of visible rays irradiating the eyeball. Further, the changes of pupil area can be recorded quantitatively at the same time without any time delay: i.e. a quick accurate diagnosis can be made without requiring any professional skill and furthermore, it is possible to make a diagnosis mechanically by applying a measured value directly to an electronic computer. The apparatus can be made simple, tiny and inexpensive.

What we claim is:

1. Pupil motion observing apparatus comprising infrared irradiating means for irradiating a pupil with infrared rays, infrared image pickup means for producing video signals of said pupil responsive to the infrared rays irradiated on the pupil to thereby display the image of the pupil in video signal form, pupil area detecting means for obtaining signals corresponding to the area of the pupil comprising means for processing said video signals scanned across the image of the pupil, means extracting pupil signals scanned across only the pupil out of the video scan signals produced by said image pickup means, means integrating the time widths of said pupil signals over each line scan presentation during an entire frame period, and means for observing the variation with time of said integrated pupil output signal of said signals.